(No Model.) 2 Sheets—Sheet 1.
A. P. SMITH.
APPARATUS FOR TAPPING AND CONNECTING MAINS.
No. 396,177. Patented Jan. 15, 1889.
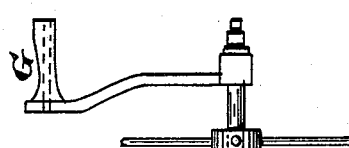
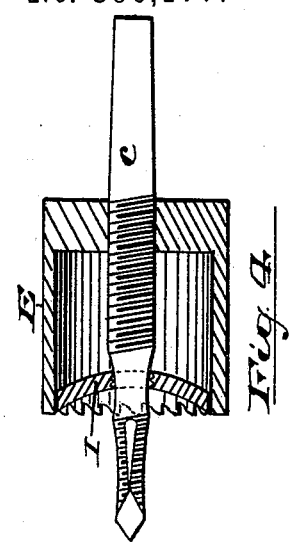
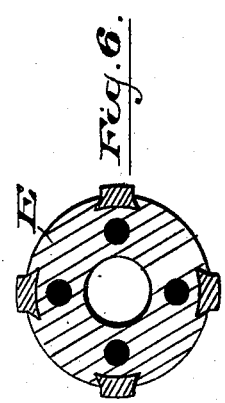
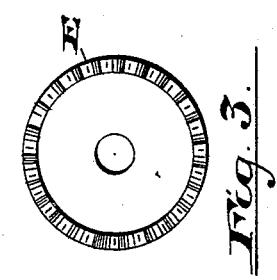
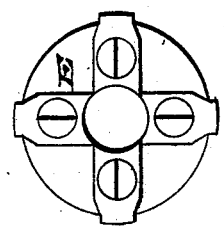
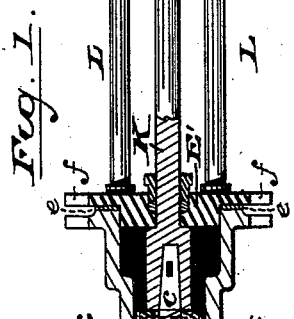
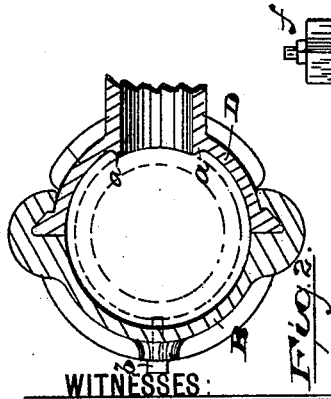
WITNESSES: Oscar A. Michel, C. H. Baldwin
INVENTOR: Anthony P. Smith
BY Drake & Co. ATT'YS.

(No Model.) 2 Sheets—Sheet 2.

A. P. SMITH.
APPARATUS FOR TAPPING AND CONNECTING MAINS.

No. 396,177. Patented Jan. 15, 1889.

WITNESSES: INVENTOR:
Oscar A. Michel Anthony P. Smith
C. H. Baldwin BY Drake & Co., ATT'YS.

UNITED STATES PATENT OFFICE.

ANTHONY P. SMITH, OF NEWARK, NEW JERSEY.

APPARATUS FOR TAPPING AND CONNECTING MAINS.

SPECIFICATION forming part of Letters Patent No. 396,177, dated January 15, 1889.

Application filed November 2, 1887. Serial No. 254,125. (No model.)

*To all whom it may concern:*

Be it known that I, ANTHONY P. SMITH, a citizen of the United States, residing at Newark, in the county of Essex and State of New Jersey, have invented certain new and useful Improvements in Branch Apparatus for Tapping and Connecting Mains; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 7:
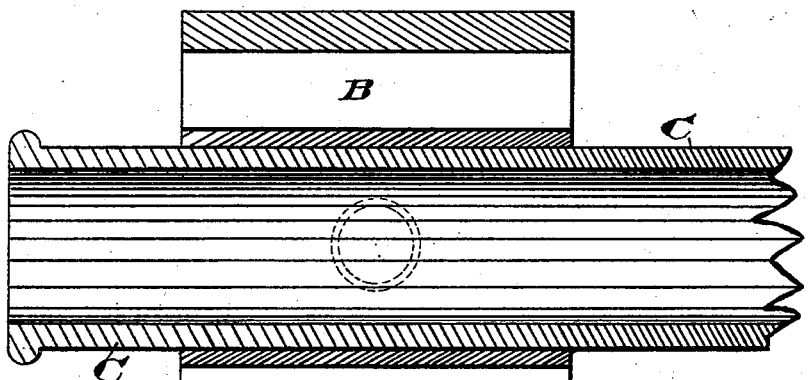
Figure 8:
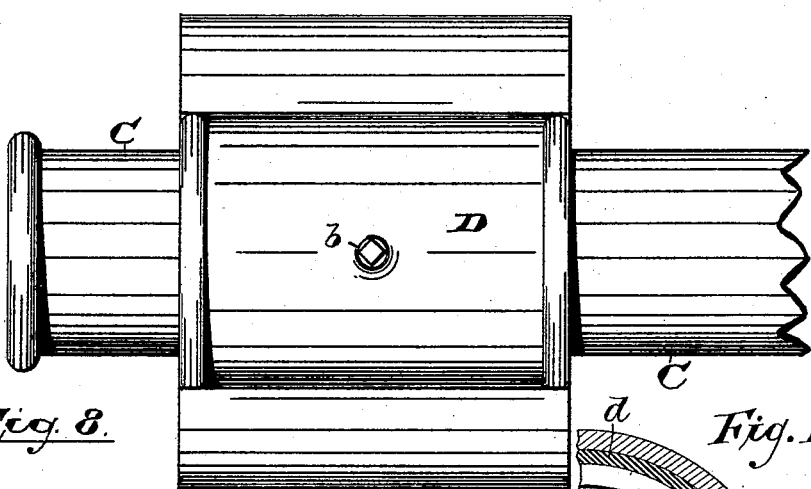
Figure 10:
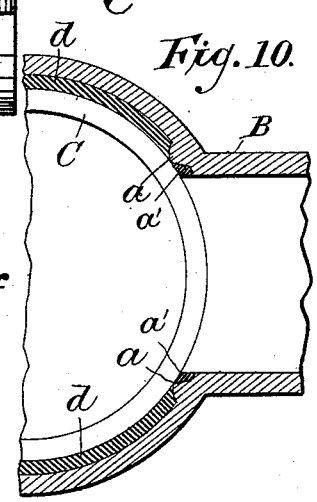
Figure 9:
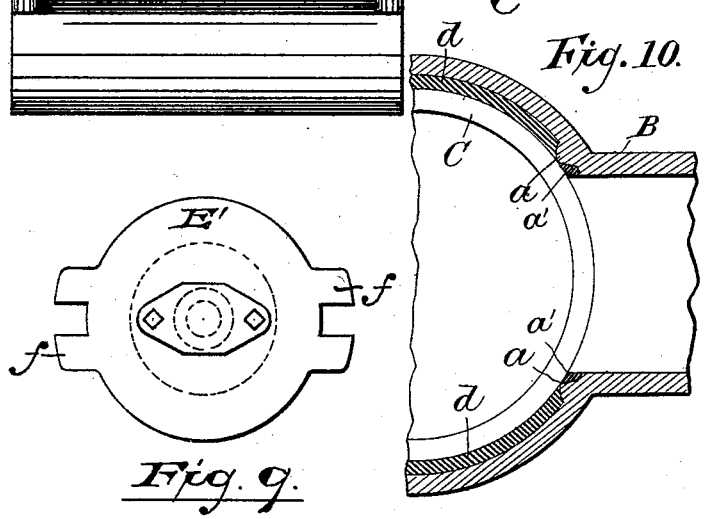

In said drawings, Figure 1, Sheet 1, represents a pipe-connection in a vertical longitudinal section and a drilling and tapping apparatus, partially in section, connected therewith and embodying my improvements. Fig. 2 is a central vertical transverse section taken through line $y$, Fig. 1, through the main pipe and sleeve and branch connections, the branch pipe being broken off. Fig. 3 is an end view of a modified form of a milling-head. Fig. 4 is a longitudinal transverse section of a cutter-head, showing a drilling-tool and tapping-tool in connection therewith. Fig. 5 is a detail plan view of the cutter-head shown in Fig. 1. Fig. 6 is a sectional view of said cutter-head, taken through line $x$ of Fig. 1. Fig. 7, Sheet 2, is a section taken through line $y$ of Fig. 1. Fig. 8 is an elevation of the rear end of the sleeve, also showing the main pipe running therethrough; and Fig. 9 is a plan of the base of the drilling and tapping machine and of the stuffing-box attached thereto. Fig. 10 is an enlarged sectional view showing the arrangement and construction of the branch pipe and the sleeve in connection with the main, showing more clearly the location of the inner and outer packings.

Similar letters of reference indicate like parts in each of the several figures.

The object of this invention is to avoid, when making connections with water, gas, steam, oil, and other mains, the necessity of shutting off the service throughout a more or less extended district adjacent to the point where the connection is to be made, thereby avoiding the stoppage of water and consequent loss should a fire occur in the shut-off district while a water-main is being tapped, as also the great inconvenience to water-consumers in the same district, who are necessarily deprived of service during the time such connections are being made in the ordinary manner.

I am aware that Letters Patent of the United States were granted to H. Mueller, July 23, 1872, No. 129,853, and James Curran, July 6, 1875, No. 165,310, for devices for tapping water and gas mains; but they are essentially different from mine, and have never, so far as I know, been found to be practicable.

It has been usual in making a connection with a water-main for any special purpose, after making the necessary excavation, to notify all the consumers within the district adjacent thereto that the water is about to be shut off within the said district. This being done, a section has to be cut from the main pipe about three inches longer than the branch to be inserted, so as to allow the branch to enter. This is done by first marking around the pipe with chalk where the pipe is to be cut, and then cutting the section from the main between the two chalk-marks, which operation is well understood. The pipe being cut and the section removed, of course all the water within the cut-off district immediately flows into the excavation. This water, together with the leakage, if there be any, has to be pumped out before the men can resume work and the excavation to be kept clear while the men are doing the work, which necessitates in most cases a more or less continuous use of the pump during the whole time required to make the connection. These difficulties not only occasion great inconvenience to the workmen, but also involve considerable waste of water. Moreover, the insertion of the branch casting involves a very heavy expense both in material and labor. Another and still more expensive method of making a connection is to tap the main in several different places and insert as many corporation-stops as are necessary to supply the size of the connection it is desired to make to connect them by pieces of lead pipe of the proper size to the larger pipe running to a building or elsewhere, as the case may be.

By means of my invention I am enabled to overcome the difficulties and defects hereinabove stated and many others; and it consists in the arrangements and combinations of parts, substantially as hereinafter set forth, and finally embodied in the clauses of the claim.

In carrying out and describing my invention I will do so in this instance as I apply it in making a connection with a water-main, which will convey to those skilled in the art the use of its application to such mains, as well as mains in general.

After excavating a hole in the ground over the main pipe, (which is not more than half as large as when making a connection in the ordinary manner,) I clear the rust from the main pipe for about a foot and a half, and after putting a packing of putty or other suitable material on or around the annular seat $a$ of the sleeve B, as indicated in Figs. 1 and 2 and more fully in Fig. 10, so as to prevent the molten lead when poured from flowing into the branch pipe while packing the sleeve, I then place the branch half, B, of the sleeve in its proper relation to the main pipe C, as indicated in Fig. 2, and slip or slide the other half, D, into connection therewith, and then set up the set-screw $b$, Fig. 1, so as to draw the packing $a'$ on the branch half of the sleeve tightly against the main pipe, as will be understood by reference to Fig. 1. The main pipe having been properly centered and the packing-space between it and the sleeve made uniform, and the packing $a'$ being in its place around the branch opening, I place a roll of clay in the packing-chamber $d$ at both ends of the sleeve, leaving an opening through which to pour molten lead into said packing-chamber until the space between the sleeve and the main pipe is filled. When the lead has set, I remove the clay at the end of the sleeve and thoroughly calk the lead packing at both ends of the sleeve. This is done by using an ordinary calking-tool. Now that the sleeve is firmly adjusted and calked around the main, I take a long calking-iron, specially made for the purpose, and, passing it through the branch opening, calk the packing $a'$, surrounding the inner end of the branch opening, thereby making a water-tight joint immediately surrounding the branch opening and main. I prefer to calk this packing $a'$ lastly, as if it were done first the molten lead poured into the chamber $d$ might work its way through or partly through the packing $a'$ and have a tendency to destroy this water-tight joint. This sleeve is three or four times in length the diameter of the branch connection to be made, thereby greatly strengthening the main at the point where the piece is to be removed. The edges of the split sleeve are so constructed as to form, when put together, a dovetail clutch or grip-joint, as shown in Figs. 1 and 2, thus avoiding the use of bolts. I then adjust a cutter, E, or milling-tool, as indicated in Figs. 1 and 5, of the desired size, onto the drill $c$ of the tapping apparatus, as will be understood by reference to said Figs. 1 and 5. A stop or gate valve, $f$, located in the valve-chamber integral with the branch portion of the sleeve, being open, I then adjust the drilling and tapping apparatus on the end of the branch pipe, with a rubber or leather gasket, $e$, between the ends of said branch and the base E' of said drilling and tapping apparatus, as shown in Fig. 1, securing the said parts by means of bolts passed through slotted lugs $f$ on the ends of said branch and base, as shown in Fig. 9. I then commence drilling by turning the crank G from left to right, and continue drilling and feeding with the feed-screw $h$ as fast as the drill at first and the cutter or milling tool afterward will carry the cut until a piece, I, is cut out of the main pipe and the cutting or milling tool passes freely through into said main pipe, making a clean smooth hole therethrough, free from burrs, &c., as will be understood. I then by reversing the feed-screw run back the tapping apparatus, which carries the cut-out piece I with it until it is stopped by the shouldered end of the drill-shaft K coming in contact with the base of the tapping-machine, at which point the end of the drill will be outside of the gate-valve, all of which will be clearly understood upon reference to said Fig. 1. I then shut down the gate-valve in the branch, remove the tapping apparatus, and the connection is completed, leaving the hub or flanged end of the branch, as the case may be, in condition to connect with the pipe leading to the building or elsewhere, as the case may require.

The shank of the drill $c$, as will be observed, is screw-threaded, and carries the cutter or milling-tool, which is screwed thereon, as in Figs. 1 and 4, the central portion of said shank being reduced or smaller than the threaded portion, as shown more particularly in Fig. 4.

By the construction of my cutter-head as shown I can employ one, two, or more cutting-tools, as the case may require, as I do not depend on them for holding or removing the piece cut from the main, but on my central drill and tap, which insure absolutely the safe removal of the piece. The cutting-tool can also be removed readily for sharpening when dull, or replaced when broken. The object of these features in the construction is, that as the central aperture is being drilled through the piece or section of the main to be removed it will be tapped at the same time, and by the time the cutter or milling-tool has completed its work said piece or section will have passed over the first threaded portion to the reduced or smaller portion of the shank, as indicated in Fig. 4, and work loosely thereon, and as the apparatus is reversed the said threaded portion acts as a shoulder and prevents the piece I from slipping off the drill, which piece, in consequence, is safely removed with the apparatus, and is thereby prevented from falling into the main or the branch, where it might do a great deal of damage, and from which it would be very difficult, if not impossible, to remove it. It will be seen, therefore, that this is a very important feature of the invention. After the drilling and tapping apparatus has been disconnected from the branch, the piece I may be easily removed from the drill by unscrewing it, as will be understood.

It will be observed by reference to Fig. 2 that the branch is connected with the male instead of the female portion of the sleeve, as in Fig. 1. As a general rule this arrangement is preferable, as in the event of the joint breaking during the operation of packing it would be most likely to happen to the female portion, in which case it would be easily replaced with another, whereas if such a break should occur with the construction shown in Fig. 1 the branch, as well as the portion of the sleeve connected with it, would have to be replaced by a new one.

As the construction of the whole apparatus will be clearly understood upon reference to the drawings, further description thereof is deemed unnecessary.

Having thus described the invention, what I claim as new is—

1. A branch connection for water, gas, and other mains, combining therein a split sleeve adjusted around said main and held together by a clutch or grip joint, and a branch connected with one of the pipe-sections of said sleeve, and provided with a gate-valve chamber made integral therewith, substantially as and for the purposes set forth.

2. The combination of a split sleeve adjusted around a main and held together by a clutch or grip, a branch connected with one of the sections of said sleeve and provided with a stop or gate valve chamber made integral therewith, and a drilling and tapping apparatus secured to the end of said branch, substantially as and for the purposes set forth.

3. The combination of a branch pipe provided with a stop or gate valve chamber made integral therewith and having an annular seat, $a$, and packing $a'$, adapted to form a water-tight joint, and a drilling apparatus connected to the end of said branch, and operated substantially as and for the purposes set forth.

4. The combination of a sleeve adjusted around the main, composed of two sections, one of which is provided with a branch pipe projecting therefrom and carrying a stop or gate valve chamber made integral therewith, a rim surrounding the opening of said branch and curved to fit the contour of the main pipe, and a set-screw carried by the other section of said sleeve, and adapted to operate substantially as and for the purposes set forth.

5. The combination, with a main pipe, of a branch sleeve having an annular raised seat, $a$, adapted to fit on said main, so as to form a packing-chamber between said sleeve and main pipe, and a packing, $a'$, substantially as and for the purposes set forth.

6. An improved apparatus for drilling and tapping mains, consisting of a drill-frame, drill-holder, drill and cutting head or milling-tool, the shank of said drill having two series of screw-threads separated by a small intervening space, one of said series holding and carrying the cutting-head or milling-tool, and the other holding the piece to be removed, said apparatus being provided with any desired means for securing it to the main, all said parts being arranged and combined as herein shown and described, and for the purposes set forth.

In testimony that I claim the foregoing I have hereunto set my hand this 29th day of October, 1887.

ANTHONY P. SMITH.

Witnesses:
OLIVER DRAKE,
CONSTANCE H. BALDWIN.